United States Patent [11] 3,627,802

| [72] | Inventor | Kenneth M. Lee |
| | | Bay City, Mich. |
| [21] | Appl. No. | 847,437 |
| [22] | Filed | Aug. 4, 1969 |
| [45] | Patented | Dec. 14, 1971 |
| [73] | Assignee | Dow Corning Corporation |
| | | Midland, Mich. |

[54] MERCAPTOMETHYL ALKOXY SILANES
2 Claims, No Drawings

[52] U.S. Cl. ..................................... 260/448.2 E,
260/448.2 N, 260/448.8 R
[51] Int. Cl. ....................................... C07f 7/02,
C07f 7/04
[50] Field of Search ........................... 260/448.2

[56] References Cited
UNITED STATES PATENTS
3,312,669  4/1967  Giordano ..................... 260/448.2 N X
3,440,302  4/1969  Speier et al. .................. 260/448.2 N X

*Primary Examiner*—James E. Poer
*Assistant Examiner*—Werten F. W. Bellamy
*Attorneys*—Robert F. Fleming, Jr., Laurence R. Hobey, Harry D. Dingman and Howard W. Hermann ABSTRACT: Compounds of the formula $HSCH_2(R'_{3-x})Si(OR)_x$ are prepared by reacting the corresponding thioacetates having the group $CH_3(C=O)SCH_2Si$ with an alcohol under basic conditions to give mercaptomethylsilanes and the acetate ester of the alcohol. For example, thioacetoxymethyl trimethoxysilane is reacted with methanol in the presence of sodium methoxide to give mercaptomethyl trimethoxysilane and methyl acetate. mercaptomethylsilanes are used to couple siliceous substances, such as clay, to diene polymers.

MERCAPTOMETHYL ALKOXY SILANES

U.S. Pat. No. 2,719,165 shows in example 5 that mercaptomethyl trimethylsilane can be prepared by reacting potassium hydroxide in absolute ethyl alcohol with hydrogen sulfide and thereafter reacting the product with chloromethyl trimethylsilane. Such a process is not feasible for the preparation of silanes having alkoxy groups on the silicon. It is further taught in U.S. Pat. No. 3,314,982 that mercaptomethylsiloxanes cannot be prepared by alkaline cleavage of the corresponding thiuronium salts. This patent teaches that attempts to so prepare the siloxane results in the cleavage of the entire mercaptomethyl group from the silicon. From this teaching it would be inferred that alkaline cleavage of a thioacetoxy methyl group on silicon would result in the elimination of sulfur from the silicon-containing molecule.

Applicant has found, however, most unexpectedly, that alkaline cleavage of a thioacetoxymethyl group on silicon gives excellent yields of the corresponding mercaptomethylsilane.

It has also been found that the mercaptomethylsilanes of this invention are about 7.5 times more reactive than the homologous mercaptoethylsilanes. This greater reactivity is especially exhibited toward the addition of the mercaptosilane to olefinic double bonds.

This invention relates to compounds of the formula $HSCH_2SiR'_{3-x}(OR)_x$ in which $R'$ is a monovalent hydrocarbon radical free of aliphatic unsaturation, or a $R_fCH_2CH_2—$ radical in which $R_f$ is a perfluoroalkyl radical, R is a lower alkyl radical or a lower alkoxyalkyl radical and $x$ is an integer from 1 to 3.

This invention also relates to a method of preparing the above compounds by reacting a compound of the formula $YCH_2SiR'_{3-x}(OR)_x$ with thioacetic acid in the presence of a tertiary amine hydrogen halide acceptor and thereafter reacting the resulting product with an alcohol under basic conditions, whereby a compound of the formula $HSCH_2SiR'_{3-x}(OR)_x$ is obtained in which compound Y is chlorine or bromine and $R'$, R and $x$ are as above defined.

In carrying out the reaction of this invention the temperature is not critical since the reaction of the thioacetic acid with the chloromethylsilane proceeds at room temperature in the presence of the hydrogen halide acceptor. In fact, the reaction is usually exothermic.

The second step of the reaction, namely, the reaction of the alcohol with the thioester also proceeds at room temperature. It can be speeded up by heating to elevated temperatures. When there are three oxygen atoms attached to the silicon it is desirable that the reaction be run at room temperature in order to avoid excessive cleavage of the mercaptomethyl groups from the silicon. When the number of oxygen atoms attached to silicon is one or two it may be desirable to run the reaction at elevated temperatures.

The first step of the reaction can be carried out with any tertiary amine. Examples of such amines are triethylamine, dimethylcyclohexylamine, tripropylamine, dimethyl aniline; or cycloamines such as pyridine, picoline or quinoline.

Any alcohol can be used in the second step of the reaction. Examples of such alcohols include linear alcohols such as methanol, ethanol, hexanol, the monomethyl ether of ethylene glycol, the monoethyl ether of diethylene glycol, the monobutyl ether of ethylene glycol and ethylene glycol; cyclic alcohols such as cyclohexanol, cyclopentanol and methylcyclohexanol and branched alcohols such as isopropanol or 2-ethylhexanol. It is preferable, but not essential, that the alcohol correspond to the alkoxy group on the silicon atoms.

Any base can be used in carrying out the reaction of this invention. This would include the alkali metal hydroxides, alkali metal alkoxides, ammonia, amines, basic ion exchange resins, quaternary ammonium hydroxides and alkaline earth metal alkoxides. The amount of basic material needed is quite small and in most cases can be used in trace quantities.

A second way of preparing the compositions of this invention is that disclosed and claimed in the copending application of Gary E. LeGrow filed concurrently herewith. This involves the decomposition of the corresponding thiuronium salts to give the mercaptomethylsilanes. It has been found that this reaction can be carried out in the absence of water in spite of the teachings of the aforesaid patent. The entire disclosure of said application is incorporated herein by reference.

A third, but less preferred method of preparing the mercaptomethylsilanes is that shown in examples 1 and 2 of this application. This involves the reaction of sodium hydrosulfide with the corresponding chloromethyl silanes in an anhydrous medium.

For the purpose of this invention $R'$ can be any monovalent hydrocarbon radical free of aliphatic unsaturation such as alkyl radicals, such as methyl, ethyl, isopropyl, butyl, octadecyl or myricyl; cycloaliphatic hydrocarbon radicals such as cyclohexyl, cyclopentyl, methylcyclohexyl or ethylcyclohexyl; aromatic hydrocarbon radicals such as phenyl, tolyl, xylyl, naphthyl, anthracyl or xenyl; and aralkyl radicals such as benzyl, beta-phenylethyl or beta-phenylpropyl. $R_f$ can be any perfluoroalkyl radical such as trifluoromethyl, perfluoroethyl, perfluorobutyl, perfluoroisobutyl, perfluoroheptyl or perfluorooctadecyl.

R can be any lower alkyl radical such as methyl, ethyl, isopropyl or hexyl; or any lower alkoxyalkyl radical such as 2-methoxyethyl, 2-butoxyethyl, or $—(CH_2CH_2O)_2CH_3$.

The silanes of this invention can be used as coupling agents between siliceous substrates such as glass, clay, asbestos or silica and organic resins such as butadiene-styrene copolymers, natural rubber, polyester resins, polystyrene and styrene-maleic anhydride copolymers. The silanes can be applied to the substrate and coupled to the resin in any of the standard ways known in the art for silane coupling agents.

The following examples are illustrative only and should not be construed as limiting the invention which is properly delineated in the appended claims.

Example 1

Ninety-two g. of Na was added slowly to 1,000 ml. of methanol. The sodium methoxide solution was placed in a pressure vessel and saturated with hydrogen sulfide at 100 lbs. per square inch pressure. 544 g. of chloromethyl dimethyl methoxy silane was pumped in and the mixture was again saturated with hydrogen sulfide and heated at 50° C. with agitation overnight. The vessel was emptied and the product neutralized with trimethyl chlorosilane, dried and filtered. The product was distilled to give mercaptomethyl dimethyl methoxysilane b.p. 139° to 140° C. at atmospheric pressure, $n_D^{25}$ 1.4463, mercaptan equivalent found 135.4, calculated 136.3.

Example 2

One hundred fifteen g. of sodium was dissolved in 900 ml. of methanol and the solution of sodium methoxide in methanol was placed in a pressure vessel and saturated with hydrogen sulfide at a pressure of 10 lbs. per sq. inch, 5 mols of chloromethyl methyl dimethoxy silane was pumped in and the mixture was heated at 65° C. for about 4 hours. The product was distilled to obtain mercaptomethyl methyl dimethoxy silane, b.p. 80° C. at 50 mm., $d_4^{25}$ 1.027; $n_D^{25}$ 1.4410, mercaptan equivalent found 155.3, calculated 152.2.

Example 3

Thioacetoxymethyl dimethyl methoxysilane was prepared by reacting chloromethyl dimethyl methoxysilane with thioacetic acid in pyridine. Pyridine hydrochloride precipitated and was removed by filtration. The product was distilled and mixed with an equal volume of methanol and enough sodium was added to make the solution basic. After standing overnight the product was analyzed by vapor phase chromatography and was found to be a mixture of methyl acetate and mercaptomethyl dimethyl methoxysilane.

Example 4

A mixture of 300 g. of thiourea and 539 g. of chloromethyl trimethoxy silane was stirred and heated to about 80° C. At this point an exothermic reaction took place and the temperature rose to 130° C. 276 g. of methanol was then added to give a 70 percent methanol solution of the isothiuronium salt. Ammonia was then passed into the solution until a liquid and solid phase was obtained. The liquid phase was decanted and distilled to give mercaptomethyl trimethoxy silane b.p. 74° C. at 10 mm., $n_D^{25}$ 1.4340, $d_4^{25}$ 1.100; percent Si calculated 16.7 found 16.75; percent S calculated 19.1 found 19.4.

Example 5

When the following silanes are reacted with thioacetic acid and methanol in accordance with the procedure of example 3, the following mercaptomethyl silanes are obtained:

| Silane | Mercaptomethyl silane |
| --- | --- |
| Bromo-methyltriethoxy silane | Mercaptomethyl triethoxy silane. |
| Chloromethyl tris-(beta-methoxy-ethoxy)-silane. | Mercaptomethyl tris-(beta-methoxyethoxy)-silane. |
| Chloromethyl phenyl dimethoxy silane. | Mercaptomethyl phenyl dimethoxy silane. |
| Chloromethyl 3,3,3-trifluoropropyl-dimethoxy silane. | Mercaptomethyl 3,3,3-trifluoropropyl dimethoxy silane. |
| Chloromethyl octadecyl di-isopropoxy-silane. | Mercaptomethyl octadecyl di-isopropoxy silane. |

That which is claimed is:

1. The method comprising reacting a compound of the formula $YCH_2SiR'_{3-x}(OR)_x$ with thioacetic acid in the presence of a tertiary amine hydrogen halide acceptor and thereafter reacting the resulting product with an alcohol under basic conditions whereby a compound of the formula $HSCH_2SiR'_{3-x}(OR)_x$ is obtained in which compounds Y is Cl or Br, R' is a monovalent hydrocarbon radical free of aliphatic unsaturation or a $R_fCH_2CH_2-$ radical where
   $R_f$ is a perfluoroalkyl radical,
   R is a lower alkyl radical or a lower alkoxy alkyl radical, and $x$ is an integer from 1 to 3.

2. The method of claim 1 in which Y is chlorine R' and R are methyl, the amine is pyridine and the alcohol is methanol.

* * * * *